US007387244B2

(12) United States Patent
Bolton et al.

(10) Patent No.: US 7,387,244 B2
(45) Date of Patent: Jun. 17, 2008

(54) ELECTRONIC VOTING SYSTEM AND METHOD WITH VOTER VERIFIABLE REAL-TIME AUDIT LOG

(75) Inventors: Steve Bolton, Omaha, NE (US); Robert Hogzett, Bellevue, NE (US); Michael Dammann, LaVista, NE (US)

(73) Assignee: Election Systems & Software, Inc., Omaha, NE (US)

( * ) Notice: Subject to any disclaimer, the term of this patent is extended or adjusted under 35 U.S.C. 154(b) by 27 days.

(21) Appl. No.: 11/139,189

(22) Filed: May 27, 2005

(65) Prior Publication Data

US 2006/0266829 A1 Nov. 30, 2006

(51) Int. Cl.
*G06K 17/00* (2006.01)

(52) U.S. Cl. ..................... 235/386; 235/51; 235/462.01; 705/12

(58) Field of Classification Search ................. 235/386, 235/51, 57; 705/12
See application file for complete search history.

(56) References Cited

U.S. PATENT DOCUMENTS

| | | | |
|---|---|---|---|
| 2,940,663 | A | 6/1960 | Fechter et al. |
| 3,218,439 | A | 11/1965 | Holzer et al. |
| 3,226,018 | A | 12/1965 | Railsback et al. |
| 3,233,826 | A | 2/1966 | Wiken |
| 3,441,714 | A | 4/1969 | Simjian |
| 3,620,587 | A | 11/1971 | Ahmann |
| 3,648,022 | A | 3/1972 | Cook |
| 3,653,587 | A | 4/1972 | Hammond et al. |
| 3,722,793 | A | 3/1973 | Aronoff |
| 3,733,469 | A | 5/1973 | Meyer |
| 3,766,541 | A | 10/1973 | Gordon et al. |
| 3,940,565 | A | 2/1976 | Lindenberg |
| 4,010,353 | A | 3/1977 | Moldovan et al. |

(Continued)

FOREIGN PATENT DOCUMENTS

| | | |
|---|---|---|
| EP | 0 419 335 | 3/1991 |

(Continued)

OTHER PUBLICATIONS

DRAFT 2—State of California Standards for "Voter Verified Paper Audit Trail", created Jan. 13, 2004.

(Continued)

*Primary Examiner*—Seung Ho Lee
(74) *Attorney, Agent, or Firm*—Stinson Morrison Hecker LLP

(57) ABSTRACT

A voting system and method with a voter verifiable real-time audit log is disclosed. The voting system includes at least one voting terminal operable to record a plurality of poll worker actions and a plurality of voter actions taken at the voting terminal. The voting system also includes at least one printer connected to the voting terminal that is operable to print the poll worker actions and the voter actions on a continuous paper roll so as to create a printed audit log in real-time as the poll worker actions and the voter actions are taken at the voting terminal. Preferably, the paper roll is secured within a locked housing such that the audit log is inaccessible to a voter using the voting terminal. The locked housing includes a display window that enables the voter to review a portion of the audit log associated with the voter in order to verify the voter actions printed on the paper roll.

42 Claims, 7 Drawing Sheets

U.S. PATENT DOCUMENTS 4,015,106 A 3/1977 De Phillipo
4,021,780 A 5/1977 Narey et al.
4,066,871 A 1/1978 Cason, Sr. et al.
4,142,095 A 2/1979 Cason, Sr. et al.
4,236,066 A 11/1980 Olmstead et al.
4,373,134 A 2/1983 Grace et al.
4,479,194 A 10/1984 Fogg et al.
4,641,240 A 2/1987 Boram
4,649,264 A 3/1987 Carson
4,717,177 A 1/1988 Boram
4,774,665 A 9/1988 Webb
4,807,908 A 2/1989 Gerbel
4,813,708 A 3/1989 Narey
4,880,202 A 11/1989 Gauss
4,928,302 A 5/1990 Kaneuchi et al.
4,981,259 A 1/1991 Ahmann
5,054,053 A 10/1991 Sakanishi et al.
5,072,999 A 12/1991 Trotta et al.
5,189,288 A 2/1993 Anno et al.
5,213,373 A 5/1993 Ramos
5,218,528 A 6/1993 Wise et al.
5,245,610 A 9/1993 Lindell
5,248,872 A 9/1993 Stewart
5,278,753 A 1/1994 Graft, III
5,299,436 A 4/1994 Spitzer
5,377,099 A 12/1994 Miyagawa
5,412,727 A 5/1995 Drexler et al.
5,497,318 A 3/1996 Miyagawa et al.
5,535,118 A 7/1996 Chumbley
5,583,329 A 12/1996 Davis, III et al.
5,585,612 A 12/1996 Harp
5,610,383 A 3/1997 Chumbley
5,612,871 A 3/1997 Skogmo
5,635,726 A 6/1997 Zavislan et al.
5,638,486 A 6/1997 Wang et al.
5,666,765 A 9/1997 Sarner et al.
5,732,222 A 3/1998 Miyagawa et al.
5,752,697 A 5/1998 Mandel et al.
5,758,325 A 5/1998 Lohry et al.
5,764,221 A 6/1998 Willard
5,821,508 A 10/1998 Willard et al.
5,871,615 A 2/1999 Harris
5,875,432 A 2/1999 Sehr
5,878,399 A 3/1999 Peralto
5,933,583 A 8/1999 Van Kuringen
6,078,902 A 6/2000 Schenkler
6,079,624 A 6/2000 Apperson et al.
6,081,793 A 6/2000 Challener et al.
6,092,051 A 7/2000 Kilian et al.
6,134,399 A 10/2000 Hino et al.
6,194,698 B1 2/2001 Zavislan et al.
6,232,993 B1 5/2001 Kobayashi et al.
6,250,548 B1 6/2001 McClure et al.
6,317,833 B1 11/2001 Jakobsson
6,412,692 B1 7/2002 Miyagawa
6,457,643 B1 10/2002 Way
6,540,138 B2 4/2003 Hall et al.
6,581,824 B1 6/2003 McClure et al.
6,606,082 B1 8/2003 Zuberec et al.
6,607,137 B2 8/2003 Morales
6,641,033 B2 11/2003 Lohry et al.
6,688,517 B1 2/2004 McClure et al.
6,694,045 B2 2/2004 Chung et al.
6,710,701 B2 3/2004 Leatherman
6,769,613 B2 8/2004 McDermott et al.
6,799,723 B2 10/2004 Kotob et al.
6,865,543 B2 3/2005 Gibbs, Sr.
6,892,944 B2 5/2005 Chung et al.
6,942,142 B2 9/2005 Barmettler et al.
6,951,303 B2 10/2005 Petersen et al.
6,968,999 B2 11/2005 Reardon
6,973,581 B2 12/2005 Chung et al.
7,032,821 B2 4/2006 McClure et al.
7,036,730 B2 5/2006 Chung
7,077,313 B2 7/2006 Chung et al.
7,077,314 B2 7/2006 Johnson
7,100,828 B2 9/2006 Cummings
7,111,782 B2 9/2006 Homewood et al.
7,178,730 B1 2/2007 Jamison et al.
7,197,167 B2 3/2007 Chung et al.
7,210,617 B2 5/2007 Chaum
7,243,846 B2 7/2007 Reardon
2001/0001859 A1 5/2001 Hawkins et al.
2001/0013547 A1 8/2001 Kotob et al.
2001/0034640 A1 10/2001 Chaum
2001/0035455 A1 11/2001 Davis et al.
2001/0042005 A1 11/2001 McClure et al.
2002/0038819 A1 4/2002 Ushioda et al.
2002/0066780 A1 6/2002 Balolia
2002/0072961 A1 6/2002 McDermott et al.
2002/0074399 A1 6/2002 Hall et al.
2002/0075246 A1 6/2002 Zheltukhln
2002/0077885 A1 6/2002 Karro
2002/0077886 A1 6/2002 Chung
2002/0078358 A1 6/2002 Neff et al.
2002/0084325 A1 7/2002 Reardon
2002/0087394 A1 7/2002 Zhang
2002/0092908 A1 7/2002 Chumbley
2002/0107724 A1 8/2002 Openshaw, III et al.
2002/0133396 A1 9/2002 Bamhart
2002/0134844 A1 9/2002 Morales
2002/0138341 A1 9/2002 Rodriguez et al.
2002/0143610 A1 10/2002 Munyer
2002/0161628 A1 10/2002 Lane Poor, Jr. et al.
2002/0169756 A1 11/2002 Biddulph
2002/0171681 A1 11/2002 Nomura et al.
2003/0006282 A1 1/2003 Vadura
2003/0026462 A1 2/2003 Chung et al.
2003/0030657 A1 2/2003 Kenji
2003/0034393 A1 2/2003 Chung
2003/0047596 A1 3/2003 Brown
2003/0062411 A1 4/2003 Chung et al.
2003/0136835 A1 7/2003 Chung et al.
2003/0173404 A1 9/2003 Chung et al.
2003/0178484 A1 9/2003 Vadura et al.
2003/0195798 A1 10/2003 Goci
2004/0046021 A1 3/2004 Chung
2004/0051368 A1 3/2004 Caputo et al.
2004/0080777 A1 4/2004 Smith
2004/0140357 A1 7/2004 Cummings
2004/0169077 A1 9/2004 Peterson et al.
2004/0195323 A1 10/2004 Vadura et al.
2004/0238632 A1 * 12/2004 Homewood et al. ......... 235/386
2005/0035199 A1 2/2005 Goci et al.
2005/0056698 A1 3/2005 Cummings et al.
2005/0061880 A1 3/2005 Vandek et al.
2005/0062410 A1 3/2005 Bell et al.
2005/0092835 A1 5/2005 Chung et al.
2005/0139666 A1 6/2005 Chou
2005/0218224 A1 10/2005 Boldin
2005/0218225 A1 10/2005 Johnson
2005/0247783 A1 11/2005 Poulos et al.
2006/0011722 A1 1/2006 Hawkins et al.
2006/0138226 A1 6/2006 McClure et al.
2006/0169778 A1 8/2006 Chung
2006/0202031 A1 9/2006 Chung et al.
2006/0255145 A1 11/2006 Chung et al.
2007/0012767 A1 1/2007 Homewood et al.
2007/0095909 A1 5/2007 Chaum

FOREIGN PATENT DOCUMENTS

FR 2 739 474 4/1997
IT 1234224 5/1992

| | | |
|---|---|---|
| JP | 7-57014 | 3/1995 |
| JP | 07264732 | 9/1995 |
| WO | 1999/52058 | 10/1999 |
| WO | 2004/023362 | 3/2004 |
| WO | 2004/032065 | 4/2004 |
| WO | 2006/114452 | 11/2006 |

OTHER PUBLICATIONS

Avante VOTE-TRAKKER, Nov. 28, 2005.

Advanced Voting Solutions—Voter Verifiable Paper Audit Trail for the WINvote Touch Screen Voting System, created Aug. 15, 2005.

Bergstein, Brian, Electronic Voting Examined; Deadline Nears, Nov. 30, 2005.

Sequoia Voting Systems website, dated Nov. 21, 2004.

H.R. 2239, Voter Confidence and Increased Accessibility Act of 2003, May 22, 2003.

On Election Day 2004, How Will You Know If Your Vote Is Properly Counted? Answer: You Won't, Congressman Rush Hold Website, http://holt.house.gov/issues2.cfm?id=5996.

Wold, Darryl R., The HAVA Requirement for a Voter Verified Paper Record, Jul. 23, 2003.

Ohio votes yes on e-voting with paper trail, By Michael Hardy, FCW.com, http://www.usatoday.com/tech/news/techpolicy/2004-06-11-ohio-yes-evoting_x.htm.

*Alternative Ballot Techniques: Hearing Before the Subcommitte on Elections of the Committee On House Administration House of Representatives* 103rd Cong. (Sep. 22, 1994)(1995).

Carbone, *Comparison of Novell Netware and TCP/IP Protocol Architectures* Jul. 16, 1995).

Saltman, R.G., *Vote-by-Phone—Pitfalls and Promises*, The Risks Digest, vol. 11:Issue 75 (May 29, 1991).

*Performance and Test Standards For Punchcard, Marksense, and Direct Recording Electronic Voting Systems*, Federal Election Commission (Jan. 1990).

1998 Advanced Card Technology Sourcebook, 1997, Faulkner & Gray, ISBN 1-57987-009-0, pp. 146-154.

Catherine Allen and William Barr "*Smart Cards: Seizing Strategic Business Opportunities*", 1997 McGraw-Hill, pp. 248-264.

Henry Dreifus and J. Thomas Monk, "*Smart Cards: A Guide to Building and Managing Smart Card Applications*" 1998, John Wiley and Sons, pp. 139-156.

W. Rankl and W. Effing, "*Smart Card Handbook*" 1997 John Wiley and Sons, pp. 61-97 and 237-272.

Jose Zoreda and Jose Oton, "*Smart Cards*" 1994, Artec House, Inc., pp. 39-45.

International Search Report, PCT/US01/45769, Jan. 6, 2003, 4 pages.

Bruce Schneier, "*Crypto-Gram*", http://www.notablesoftware.com/Press/Schneier.html, Dec. 15, 2000, 3 Pages.

Michael Stanton, "*The Importance Of Recounting Votes*", http://www.notablesoftware.com/Press/electronic.sub.--voting.sub.--in.sub-.--brasil.htm, Rio De Janeiro, Brazil, Nov. 13, 2000, 3 Pages.

Peter G. Neumann, "*International and Electronics Voting*", The Risks Digest, vol. 21, Issue 14, http://www.notablesoftware.com/Papers/Risks2114.html, Dec. 12, 2000, 3 Pages.

Peter G. Neumann, "*Security Criteria For Electronic Voting*", http://www.csl.sri.com/users/neumann/nes93.html, Menlo Park, CA, Sep. 20-23, 1993, 3 Pages.

Federal Election Commission, "*Performance And Test Standards For Punchcard, Marksense, And Direct Recording Electronic Voting Systems*" Jan. 1990, pp. (including i-xvi, 12-19, 28-35, 45-55, C1-C3 and E1-E10).

Alan Dechert, "*The Votor Certified Ballot*", Granite Bay, CA., http://www.go2zero.com/votereform.html, Feb. 13, 2001, 15 Pages.

Mike McLaughlin, "*Voting Receipt*", http://catless.ncl.ac.uk/Risks/2.22.html, 1986, 1 Page.

Robert Wright, "*Recasting The Voting Process*", www.varbusiness.com, Mar. 5, 2001, 4 Pages.

NEDAP Voting System, 4 Pages, .COPYRGY. 2000.

Surveys International, TouchVote, ACEEEO Conference, "*Information Technology in Elections*", Warsaw, Poland, 2 pages, Jun. 14-16, 2000.

UniLect Corporation, The Patriot Voting Systems, http://www.unilect.com/patrpack.html, 4 Pages, .COPYRGT. 1996.

Hart Interactive, eSlate Electronic Voting System, http://www.worldwideelection.com/GoveSlate.cfm, 2 Pages, .COPYRGT. 1998-2000.

VoteHere.net, http://votehere.net/VH-Content-v2.0/platinuminfo.html, 1 Page, .COPYRGT. 1999-2000.

Webvote Inc., Laptop Software for the New Generation of Voting, http://www.webvote-inc.com/laptop.htm, 2 Pages, .COPYRGT. 1999.

A. Riera, J. Borrell, J. Rifa, "*An uncoercible verifiable electronic voting protocol*," Proceedings of IFIP SEC '98, Online, Sep. 4, 1998, pp. 206-215, XP002272039, Austria.

Benaloh J et al, "*Receipt-Free Secret-Ballot Elections* (*Extended Abstract*)," Proceedings of the Annual ACM Symposium on the Theory of Computing, XX, XX, 1994, pp. 544-553, XP002099996.

Jinn-Ke Jan et al, "*A Secure Electronic Voting Protocol With IC Cards*," Security Technology, 1995. Proceedings, Institute of Electrical and Electronics Engineers 29th Annual 1995 International Carnahan Conference on Sanderstead, UK Oct. 18-20, 1995, New York, NY USA, OCt. 18, 1995, pp. 259-265, XP010196424.

esp@cenet--Document Bibliography and Abstract, "*Voting Method And Means For Carrying Out This Method*," Patent No.: EP0419335, Publication Date: Mar. 27, 1991, Applicant: PGS SARL, Printed Apr. 29, 2004, 1 Page.

esp@cenet--Document Bibliography and Abstract, "*No English Title Available*," Patent No.: FR2739474, Publication Date: Apr. 4, 1997, Printed Apr. 29, 2004, 1 Page.

English Language-Abstracts, For FR 2739474 A1 (WPI ACC No.: 1997-238623/199722) and for EP 419335 A (WPI ACC No.: 1991-088914/199113), <http://www.dialogclassic.com/COMMAND.HTML>, Printed Apr. 29, 2004, 1 Page.

Scientific Translation Services, FR 2739474, English Translation of pp. 5-6, and figures (Translated May 2004), 9 Pages.

Scientific Translation Services, "*Novel Voting Process and Means For Carrying Out Same*," [EPO 0 419 335 A1] English Translation of col. 1-10, (Translated May 2004), 8 pages.

European Patent Office, "*Communication and Supplementary European Search Report*," EP No.: 0127 3930.6-2221-US0145769, Mar. 24, 2004, 5 Pages.

International Search Report, PCT/US02/24358, 3 Pages.

United State of America 108th Congress. 1st Session, H. R. 2239, A Bill, "*Voter Confidence and Increased Accessibility Act of 2003*", Section 4.

O'Connell, Ann, State of Nevada Senate, Letter to Ms. Kathryn Ferguson , Clark County Board of County Commissioners, Jun. 6, 1995.

Mercuri, Rebecca, "*Electronic Vote Tabulation Checks & Balances*," Ph.D. Dissertation Defense, Thesis Abstract, University of Pennsylvanis School Engineering and Applied Science, Department of Computer and Information Systems, Friday, Oct. 27, 2000, 2:30 pm http://www.nostablesoftware.com/Papers/thesdefabs.html.

Mercuri, Rebecca, "*Electronic Vote Tabulation Checks & Balances*," A Dissertation in Computer and Information Science, Presented to the Faculties of the University of Pennsylvania in Partial Fulfillment of the Requirements for the Degree of Doctor of Philosophy, 2001.

Dugger, Ronnie, "*Annals of Democracy Counting Votes*," The New Yorker, Nov. 7, 1988 http://www.csl.sri.com/users/Neumann/dugger.html.

Saltman, Roy G., "*Accuracy, Integrity, and Security in Computerized VoteTallying*," Computer Science and Technology, NBS Special Publication 500-158, Institute for Computer Sciences and Technology, National Bureau of Standards, Aug. 1988 http://www.itl.nist.gov/lab/specpubs/500-158.html.

Mercuri, Rebecca, "*Voting-Machine Risks*," Inside Risks 29, CACM 35, Nov. 11, 1992 http://notablesoftware.com/Papers/vmrisks.html.

Shamos Ph.D., J.D., Michael Ian, "*CFP'93--Electronic Voting--Evaluating the Threat*," CPSR, 1993 http://www.cpsr.org/conferences/cfp93/shamos.html, Mar. 1993.

Mercuri, Rebecca, "*Corrupted Polling*," Inside Risks 93 CACM 36, Nov. 11, 1993, p. 122 http://www.notablesoftware.com/Papers/corrpoll.html.

Saltman, Roy G., "*CFP'93--Assuring Accuracy, Integrity and Security in National Elections: The Role of the U.S. Congress*," CPSR, National Institute of Standards and Technology, Feb. 12, 1993 http://www.cpsr.org/conferences/cfp93/saltman.html.
Mercuri, Rebecca, "*The FEC Proposed Voting Systems Standard Update [A Detailed Comment]*," Submitted to the Federal Election Commission on Sep. 10, 2001 in accordance with Federal Register FEC Notice 20019, vol. 66, No. 132 http://www.notablesoftware.com/Papers/FECRM.html.
Mercuri, Rebecca T., "*Physical Verifiability of Computer Systems*," Notable Software, 1997.
"*Voters Prefer To See Their Votes Recorded On Paper According to Surveys Reported by AccuPoll*," BUSINESSWIRE, Feb. 3, 2003.
"*Resolution on electronic voting*" Last modified Jan. 20, 2000 http://verify.Stanford.edu/dill/EVOTE/statement.html.
"*Voting--What Is, What Could Be*," Caltech MIT, Voting Technology Project, Jul. 2001.
*Newspaper Articles--Las Vegas Review Journal*-- Jul. 1994.
Rebecca Mercuri--*Explanation of Voter-Verified Ballot Systems*--Jul. 2002.
May 1995 *Minutes of Senate Committe*.
May 1995--*Minutes of Assembly Committee on Electronics and Procedures*.
Feb. 1995--*Minutes of Senate Committe on Government Affairs*.
1986--*HYDE--Progress Report on Computerized Voting*.
1986--BENSON--*Computerized Voting*.
Decarvalho, Luiz Pinto, *Electronic Elections*, IEEE Spectrum, Feb. 2003, p. 15, New York, New York, USA.
Bellinger, Robert, *Can We Be Spared A Repeat of Election* 2000?, IEEE, Feb. 2001, pp. 1-3, New York, New York, USA.
*Risk Digest*, vol. 10: Issue 78, Jan. 22, 1991.
*Risk Digest*, vol. 2: Issue 22, Mar. 5, 1986.
*Risk Digest*, vol. 10: Issue 23, Mar. 6, 1986.
*Risk Digest*, vol. 7: Issue 78, Nov. 15, 1988.
*Risk Digest*, vol. 10: Issue 61, Nov. 16, 1990.
*Risk Digest*, vol. 11: Issue 75, May 29, 1991.
*Risk Digest*, vol. 11: Issue 39, Apr. 4, 1991.
*Risk Digest*, vol. 11: Issue 40, Apr. 5, 1991.
*Risk Digest*, vol. 13: Issue 72, Aug. 12, 1992.
*Risk Digest*, vol. 13: Issue 84, Oct. 19, 1992.
*Risk Digest*, vol. 14: Issue 10, Nov. 25, 1992.
*Risk Digest*, vol. 14, Issue 11, Nov. 27, 1992.
*Risk Digest*, vol. 16: Issue 52, Oct. 31, 1994.
*Risk Digest*, vol. 21: Issue 10, Nov. 7, 2000.
*Risk Digest*, vol. 21: Issue 11, Nov. 8, 2000.
*Risk Digest*, vol. 22: Issue 54, Feb. 6, 2003.
*Risk Digest*, vol. 22: Issue 66, Apr. 1, 2003.
M. Bellis, Inventors, *The History of Voting Machines*, 6 Pages, http://inventors.about.com/science/inventors/library/weekly, described in a printed publication more than one year prior to May 27, 2005, the effective filing date of this application.
Microvote Corp., Microvote Infinity, http://www.microvote.com/howto.htm, Indianoplis, IN, 5 Pages, described in a printed publication more than one year prior to May 27, 2005, the effective filing date of this application.
AccuVote-TS, *The Accuvote-TS*, http://www.gesn.com/AccuVote-TS.accuvote-ts.html, Global Election Systems, Inc., 4 Pages, described in a printed publication more than one year prior to May 27, 2005, the effective filing date of this application.
Monterey County Election Dept., Early Voting Information, http://www.mocovote.org/touchscreen/index.htm, 8 Pages, described in a printed publication more than one year prior to May 27, 2005, the effective filing date of this application.
Shoup Voting Solutions Inc., Services, http://www.shoupvote.com/services.html, 1 Page, described in a printed publication more than one year prior to May 27, 2005, the effective filiing date of this application.
Fargo Electronics, Inc., "*The ID With A Ph.D*", advertisement, 1 Page, described in a printed publication more than one year prior to May 27, 2005, the effective filing date of this application.
"*The History of Electronic Voting*", http://www.eucybervote.org/Reports/KUL-WP2-D4V1-v1.0-01.htm, 10 pages, described in a printed publication more than one year prior to May 27, 2005, the effective filing date of this application.
Kofler, Robert; Krimmer, Robert; Prosser, Alexander, *Electronic Voting: Algorithmic and Implementation Issues*, IEEE Computer Society, 7 pages, New York, New York USA, described in a printed publication more than one year prior to May 27, 2005, the effective filiing date of this application.
Election Systems and Software, Inc., *The iVotronic Voting System Operations Manual*, Version 5.1.2, Omaha, NE, Jan. 2001.
Election Systems & Software, Inc., *ES&S Responses to CA Touch Screen Task Force*, 12 pages, described in a printed publication more than one year prior to May 27, 2005, the effective filing date of this application.
California Secretary of State, *Draft* 2, *State of California Standards For Use of Voter Verified Paper Audit Trail Systems in Direct Recording Electronic* (*DRE*) *Voting Machines*, 8 pages, described in a printed publication more than one year prior to May 27, 2005, the effective filiing date of this application.
Ohio Secretary of States, *State of Ohio Standards For Voter Verified Paper Audit Trail Systems in Direct Recording Electronic* (*DRE*) *Voting Machines*, 8 pages, Nov. 16, 2004.
California Secretary of State Kevin Shelley, *Secretary of State Kevin Shelley Announces Directives to Ensure Voter Confidence in Electronic Systems*, 1 page, Nov. 21, 2003.
Adler, J., 1. *Voter Verification* (*cast as intended*), 3 pages, described in a printed publication more than one year prior to May 27, 2005, the effective filing date of this application.
IEEE, *IEEE P*1583 *Ballot Comment Submission Form*, 8 pages, described in a printed publication more than one year prior to May 27, 2005, the effective filing date of this application.
U.S. Election Assistance Commission, *Voluntary Voting System Guidelines*, described in a printed publication more than one year prior to May 27, 2005, the effective filing date of this application.
Description of Sequoia Voting Systems DRE Machine (attached as Exhibit A), in public use more than one year prior to May 27, 2005, the effective filing date of this application.
Description of Avante International Technologies, Inc. DRE Machine (attached as Exhibit B), in public use more than on year prior to May 27, 2005, the effective filing date of this application.
Ted Selker, *Fixing the Vote*, Scientific American, Oct. 2004, pp. 90-97.

* cited by examiner

ELECTRONIC VOTING SYSTEM AND METHOD WITH VOTER VERIFIABLE REAL-TIME AUDIT LOG

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to voting systems, and more particularly to an electronic voting system in which a voter verifiable audit log is printed in real-time as actions are taken at a voting terminal.

2. Description of Related Art

In recent years, electronic voting systems have been widely used in elections throughout the world. Typically, an electronic voting system includes multiple voting stations each of which comprises a direct recording electronic (DRE) voting terminal. In operation, a voter selects his/her votes via a touch screen or other input device of the voting terminal. Once the voter casts his/her ballot, the voter's selection of votes are stored in the memory of the voting terminal and electronically tabulated with the vote selections of other voters. Upon poll closing, the vote totals are downloaded from the memory of the voting terminal for final tabulation with the vote totals from other voting terminals.

One issue that has been raised by computer experts with respect to electronic voting systems is that there is no paper record of the voter's selection of votes. As such, many voters are skeptical of the integrity of the election process and believe that their electronic votes may not be counted correctly. In an attempt to resolve this issue, electronic voting systems have been developed in which the voter's selection of votes are printed on either a paper ballot or a paper receipt that may be examined by the voter and/or used for auditing purposes.

In a "paper ballot" type of electronic voting system (an example of which is disclosed in U.S. Pat. No. 6,769,613), each voting station includes a voting terminal with a printer that prints a paper ballot in accordance with the voter's selection of votes. The paper ballot is provided to the voter, whereby the voter has an opportunity to examine the paper ballot for correctness with regard to his/her selection of votes. If the voter observes that the paper ballot correctly represents his/her selection of votes, he/she submits the paper ballot for final tabulation by a tabulating machine. If not, the paper ballot is destroyed and the voter is directed to another voting station to repeat the voting process.

Alternatively, the voter may insert the paper ballot into a ballot scanning machine connected to the voting terminal. If the scanned paper ballot is identical to the selection of votes stored in the memory of the voting terminal, the ballot scanning machine imprints the paper ballot with a validation code and the selection of votes are permanently stored in the memory of the voting terminal. The paper ballot is then returned to the voter who submits the paper ballot for final tabulation by a tabulating machine. If, however, the scanned paper ballot is not identical to the selection of votes stored in the memory of the voting terminal, the ballot scanning machine invalidates the paper ballot and the selection of votes are erased from the memory of the voting terminal. The paper ballot is then destroyed and the voter is directed to another voting station to repeat the voting process.

In a "paper receipt" type of electronic voting system, each voting station includes a voting terminal with an associated printer. After all of the votes have been selected, a summary page listing the voter's selection of votes is displayed on the voting terminal for review by the voter. In addition, the printer prints a paper receipt with a summary of the voter's selection of votes. The paper receipt is not provided to the voter, but is instead retained behind a protective window that allows the voter to examine the paper receipt for correctness with regard to his/her selection of votes. If the voter observes that the paper receipt correctly represents his/her selection of votes, he/she then casts his/her ballot by pressing a "cast ballot" button, whereby the paper receipt may be cut by a paper cutter and dropped into a locked ballot box associated with the voting terminal. If the voter changes his/her mind after reviewing the paper receipt, the voter may reject (i.e., cancel) the ballot and the paper receipt will be marked as "rejected." The voter may reject the ballot up to two times, just as is regulated with a standard paper ballot.

One problem with the electronic voting systems described above is that they do not track all of the actions taken at the voting terminal. Rather, the paper ballot/paper receipt merely includes a summary of the voter's final selection of votes. As such, auditing the paper ballots would not uncover vote tabulation errors caused by poll worker actions taken at the voting terminal (e.g., in cases where poll workers mistakenly input actual vote selections into the voting terminal because they are not familiar with or trained properly on the voting terminal). In addition, the paper ballot/paper receipt does not include every action taken by the voter during the voting process.

Another problem with some of these electronic voting systems is that the paper receipt must be cut before it is dropped from the voting terminal into a locked ballot box. Thus, the voting terminal must include a paper cutter for cutting the paper receipt, which adds to the complexity and cost of the system. Also, the individual paper receipts are difficult to assemble for recount purposes. In addition, the large amount of storage space required to store the individual paper receipts is similar to that required for mechanical voting systems using standard paper ballots.

Yet another problem with some of these electronic voting systems is that the use of the voting terminal is more complex than "paperless" electronic voting systems. In some systems, the voter must examine the paper ballot and, if acceptable, submit the paper ballot for final tabulation by a tabulating machine. In other systems, the voter must insert the paper ballot into a ballot scanning machine and, if validated, submit the paper ballot for final tabulation by a tabulating machine. In yet other systems, the voter must compare the results of two different methods of display for the ballot (i.e., the paper receipt vs. the summary page displayed on the voting terminal). As a result, the voting terminal must display additional voting instructions and/or instruction screens. Also, the voter's ability to reject a ballot causes the waste of paper. In addition, the voter must perform additional steps and/or spend an increased amount of time in the voting booth (e.g., reviewing the printed summary of vote selections). Furthermore, poll workers must be trained on the use of the voting systems so as to be able to provide adequate voter assistance.

BRIEF SUMMARY OF THE INVENTION

The present invention is directed to a voting system that includes one or more voting stations located within a voting precinct. Each of the voting station(s) comprises a voting terminal and an associated printer that is operable to print all of the actions taken at the voting terminal on a printable medium to thereby create a printed audit log for the voting terminal. These actions may include poll worker actions (such as poll opening, poll closing, screen calibration, time reset, report printed, PEB activation, PEB deactivation, supervisory ballot cast, and supervisory ballot cancelled) and voter actions (such as ballot selection, ballot de-selection, and ballot cast). Preferably, the audit log is created in real-time as the poll worker actions and the voter actions are taken at the voting terminal.

In an exemplary embodiment, the printable medium comprises a continuous paper roll on which is printed all of the actions taken at the voting terminal between poll opening and poll closing. Preferably, the printable medium is secured within a locked housing such that the audit log is inaccessible to a voter using the voting terminal. However, the locked housing includes a display window that enables the voter to review a portion of the audit log associated with the voter in order to verify the correctness of the voter actions printed on the printable medium.

In the exemplary embodiment, the printer is also operable to print a plurality of voter bar codes on the printable medium. Each of the voter bar codes contains information corresponding to a ballot cast by a voter at the voting terminal, and is preferably printed on the printable medium proximate the printed voter actions for that voter. A commercially available bar code reader is also provided to scan the voter bar codes printed on the printable medium. Importantly, the bar code reader operates independently of the voting terminal so as to enable an independent comparison of the voter bar codes with the voter actions printed on the printable medium for auditing purposes.

The printer is further operable to print a voting terminal bar code on the printable medium. The voting terminal bar code contains information corresponding to the vote totals of all ballots cast by the voters at the voting terminal, and is preferably printed at the terminal end of the printable medium so that it may be easily scanned by the bar code reader. The bar code reader can thus be used to scan the voting terminal bar codes of all of the voting terminals in the voting precinct.

Finally, the voting system also includes a computer that may be connected to the bar code reader so as to download the vote totals for all of the voting terminals located in the voting precinct. The computer is programmed to accumulate these vote totals to thereby generate vote totals for the entire voting precinct. As with the bar code reader, the computer operates independently of the voting terminal so as to provide an independent verification of the vote totals for the voting precinct.

The present invention has several advantages over the prior art. For example, the voting system tracks all of the actions taken at the voting terminal, including both poll worker actions and voter actions, to thereby increase the audit capabilities of the voting terminal. Also, the configuration of the printable medium (e.g., a continuous paper roll) does not require a paper cutter and reduces the amount of paper jams due to more consistent feeding of paper from the paper roll. The paper roll may also be easily fed into a high-speed reader for recount purposes. Also, the paper roll requires a minimal amount of storage space.

In addition, the voting system does not require the voter to take any additional action with respect to the printed audit log such that the use of the voting terminal is similar to that of "paperless" voting terminals. As such, the voting terminal may display a reduced number of voter instructions that will likely result in the voter spending less time in the voting booth. Furthermore, the amount of poll worker training is reduced, as is the amount of time that a poll worker may need to spend with voter assistance. Of course, other advantages of the invention will be apparent to one skilled in the art.

DETAILED DESCRIPTION OF THE INVENTION

The present invention is directed to a voting system and method with a voter verifiable real-time audit log. In accordance with the invention, all of the actions taken at a voting terminal are printed on a printable medium in real-time so as to create a printed audit log for the voting terminal. These actions may include both poll worker actions and voter actions taken at the voting terminal. A voter is able to review a portion of the printed audit log associated with the voter in order to verify the correctness of the voter actions printed on the printable medium. As such, the printed audit log may be used for both auditing purposes and voter verification.

Figure 1:
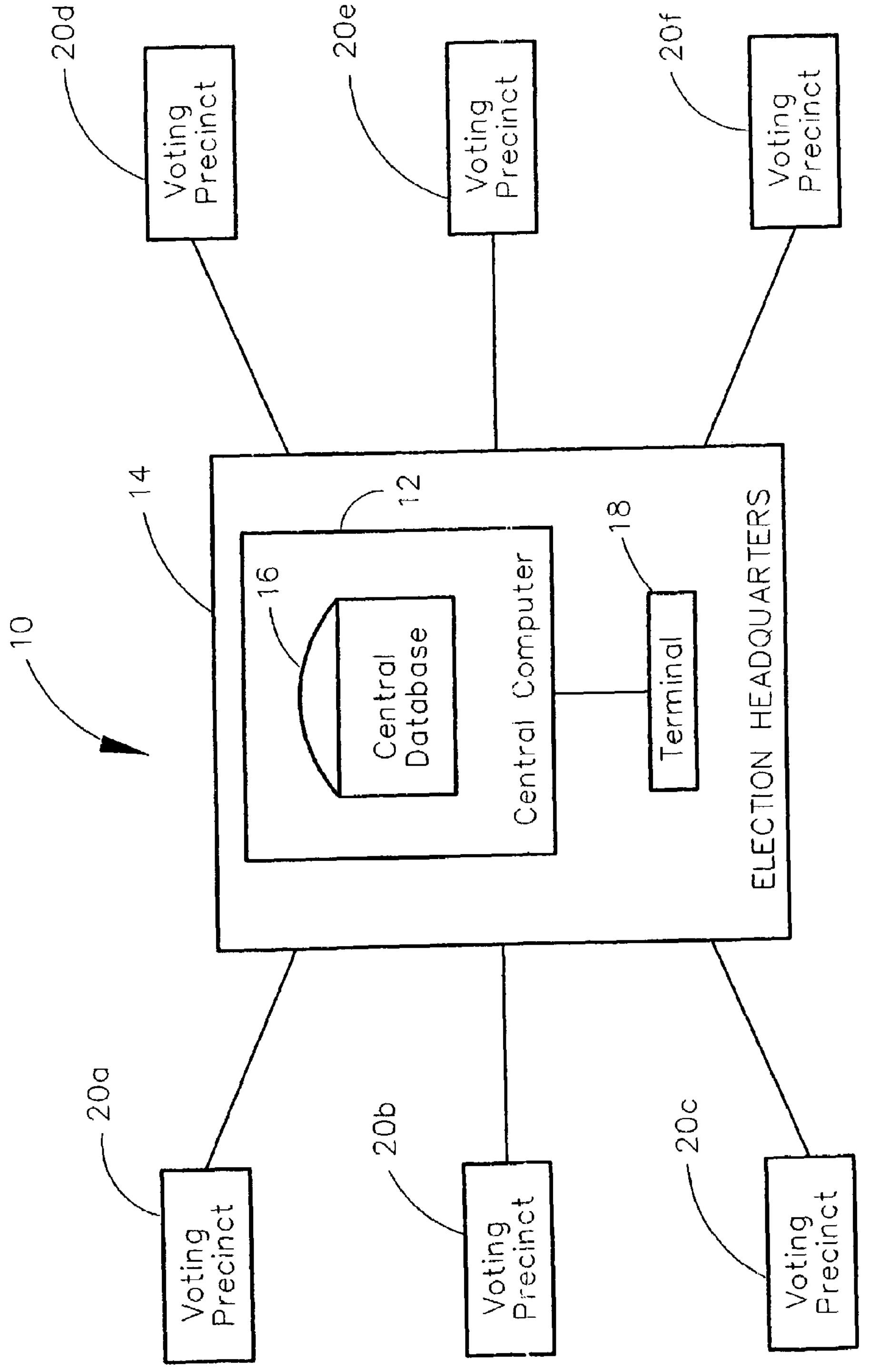
FIG. 1 is a block diagram of a voting system in accordance with an exemplary embodiment of the present invention.

Referring now to FIG. 1, an exemplary embodiment of a voting system in accordance with the present invention is designated generally as reference numeral 10. Voting system 10 includes a central computer 12 located at an election headquarters 14. Central computer 12 includes a central database 16 for storing various types of election information, such as voter registration lists, candidate lists, referendum information, ballot configurations, and the like. A terminal 18 is connected to central computer 12 so that selected information from central database 16 can be transferred to a master personalized electronic ballot (PEB), as described below.

Voting system 10 also includes a plurality of voting precincts 20*a*-20*f*. Although six voting precincts have been shown in FIG. 1 for ease of illustration, it should be understood that voting system 10 may include any number of voting precincts. The ballot data for each of voting precincts 20*a*-20*f* is formulated at election headquarters 14 prior to an election and stored in central database 16. The ballot data typically includes the candidates and/or referendum issues that will appear on the ballot for the particular voting precinct. The ballot data for each voting precinct is transferred from central database 16 to an internal memory of a master PEB for that voting precinct. The master PEB is then used for transporting the ballot data between election headquarters 14 and the voting precinct. It will be seen that the master PEB is also used to store the vote totals for the voting precinct after the election is over.

Figure 2:
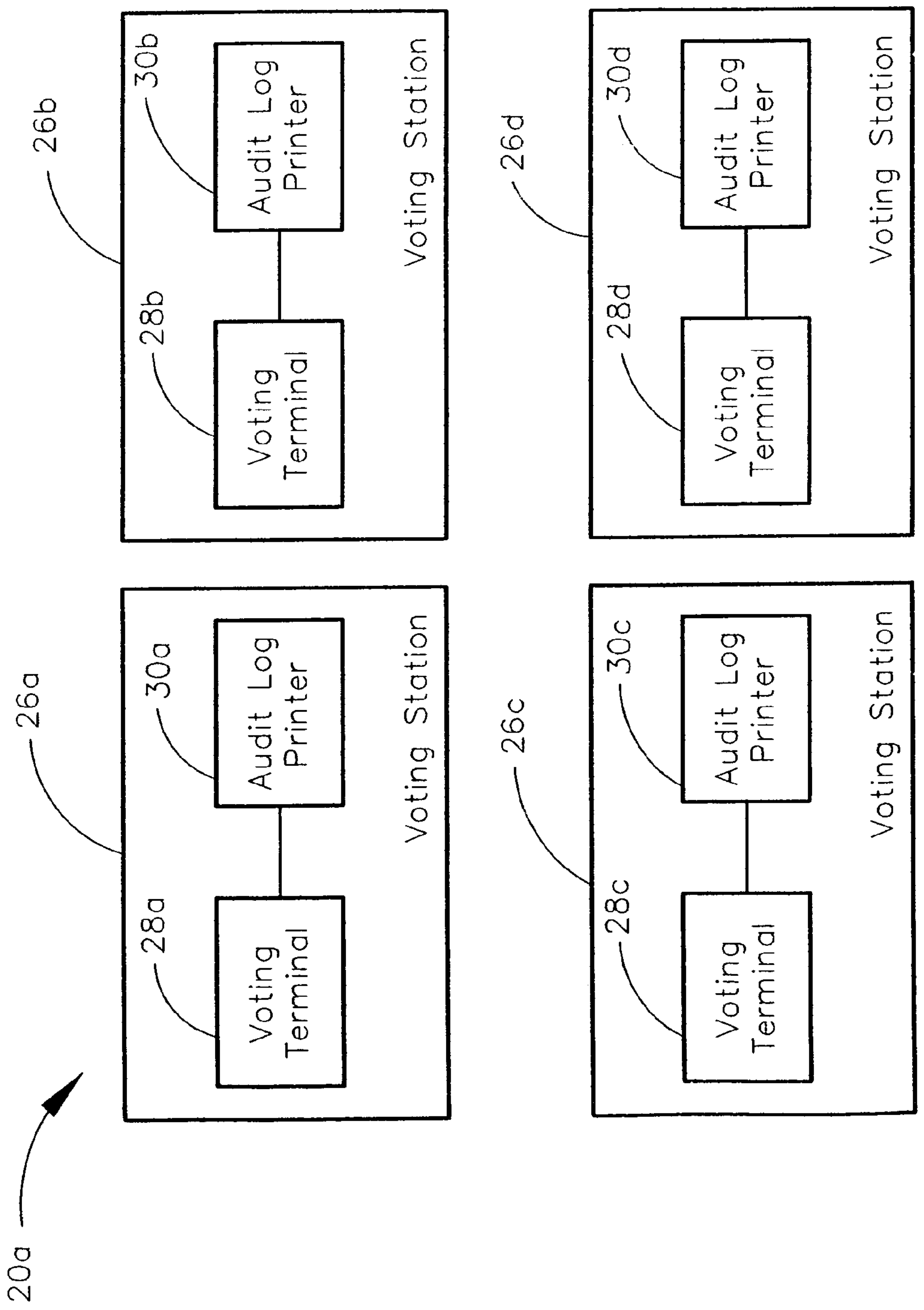
FIG. 2 is a block diagram of one of the voting precincts of FIG. 1.

Referring to FIG. 2, the system components of voting precinct 20*a* will now be described in detail (wherein it should be understood that the system components of each of voting precincts 20*b*-20*f* are similar to that of voting precinct 20*a*). Voting precinct 20*a* includes a plurality of voting stations 26*a*-26*d*. Although four voting stations have been shown in FIG. 2, it should be understood that voting precinct 20*a* may include any number of voting stations depending on the size of the voting precinct.

Voting stations 26*a*-26*d* each include a direct recording electronic (DRE) voting terminal 28*a*-28*d* and an audit log printer 30*a*-30*d*. Voting terminals 28*a*-28*d* each include a PEB reader/writer for reading information from and writing information to various PEBs (as will be described in greater detail hereinbelow with reference to FIG. 3). Each of voting terminals 28*a*-28*d* is a generic voting machine that can be programmed with ballot data for voting precinct 20*a* by inserting the master PEB for voting precinct 20*a* into the PEB reader/writer and transferring the ballot data stored on the master PEB to the voting terminal. Since each of voting terminals 86*a*-28*d* is configured by the ballot data stored on the master PEB, the voting terminals each stand alone and are not connected to any other system.

Figure 3:
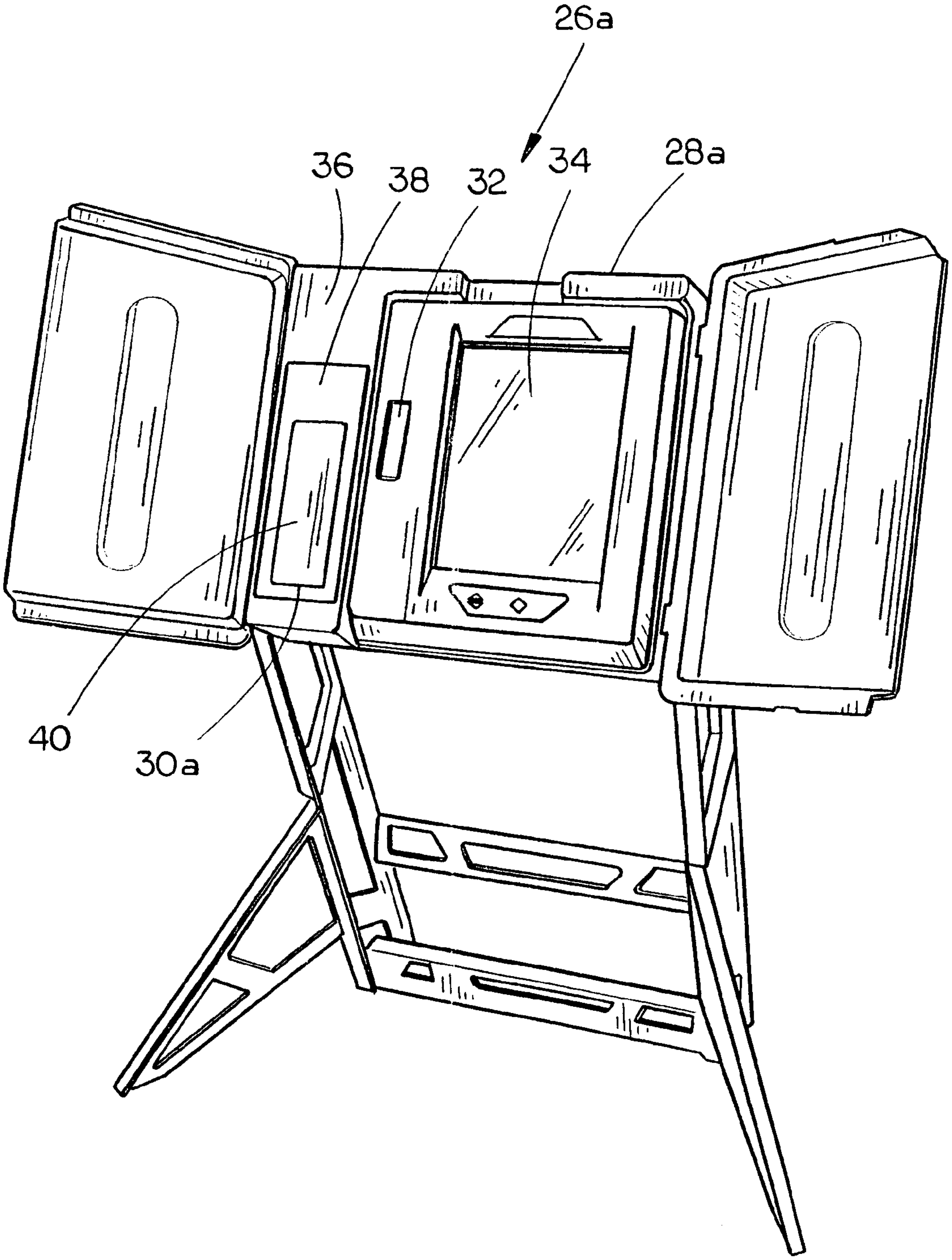
FIG. 3 is a perspective view of one of the voting stations of FIG. 2, showing the voting terminal and associated audit log printer.

Referring to FIG. 3, the configuration of voting station 26*a* will now be described in detail (wherein it should be understood that the configuration of each of voting stations 26*b*-26*d* is similar to that of voting station 26*a*). Voting station 26*a* comprises a voting terminal 28*a* connected to an audit log printer 30*a*, wherein voting terminal 28*a* generally includes a PEB reader/writer 32, a display 34, and an internal computing system (not shown).

PEB reader/writer 32 of voting terminal 28*a* is operable to read information from and write information to various PEBs, such as a master PEB, a supervisor PEB and/or a voter PEB. The configuration of PEB reader/writer 32 is described in greater detail in U.S. Pat. No. 5,583,329 assigned to the assignee of the present application, which is incorporated herein by reference. In the exemplary embodiment, there are two possible modes of activation for voting terminal 28*a*—poll worker activation mode and voter activation mode.

In poll worker activation mode, a poll worker activates voting terminal 28*a* by inserting a supervisor PEB into PEB reader/writer 32. Upon activation, the ballot data transferred from the master PEB to voting terminal 28*a* (described above) is displayed on display 34 of voting terminal 28*a*.

By contrast, in voter activation mode, a poll worker activates a voter PEB at a supervisor terminal (not shown) by writing an activation security code to the voter PEB. The poll worker provides the voter PEB to the voter who proceeds to voting terminal 28*a* and inserts the voter PEB into PEB reader/writer 32. PEB reader/writer 32 reads the activation security code from the voter PEB, whereby the ballot data is displayed on display 34 of voting terminal 28*a*. After the voter has completed the voting process, PEB reader/writer 32 writes a deactivation security code to the voter PEB so that it cannot be used again by subsequent voters until the voter PEB is again reactivated by a poll worker at the supervisor terminal.

Display 34 of voting terminal 28*a* is operable to display the ballot data for voting precinct 20*a*. In the illustrated embodiment, display 34 comprises a liquid crystal display (LCD) configured as a touch screen display so that a voter may select candidates and/or positions on referendums by merely touching the appropriate locations on display 34 with either a finger or a computer pen (not shown). Alternatively, if display 34 is not configured as a touch screen display, an array of switches may be included as part of voting terminal 28*a* for allowing the input of voter selections. Display 34 may also comprise a cathode ray tube (CRT) display configured as a touch screen display located external to voting terminal 28*a*. In such a configuration, the display would be connected to voting terminal 28*a* through a dedicated I/O connector of voting terminal 28*a*. Of course, other types of displays are also possible.

The internal computing system of voting terminal 28*a* is surrounded and protected by a sealed housing 36. The internal computing system includes a processor and various types of memory, as is known in the art. Preferably, the processor comprises a suitable microprocessor having sufficient processing capability and speed for operating voting terminal 28*a*. The memory may include any type of memory that is suitable for storing the ballot data, an electronic audit log, vote totals, and other information necessary for the operation of voting terminal 28*a*. In the exemplary embodiment, the memory comprises flash memory, EEPROMs, and a compact flash memory device or other removable data storage system. It will be seen that the compact flash memory device stores a back-up copy of the electronic audit log and is removed from voting terminal 28*a* after the election for transport to election headquarters 14.

Referring still to FIG. 3, audit log printer 30*a* is operable to print a description of all actions taken at voting terminal 28*a* on a printable medium so as to create a printed audit log of voting terminal 28*a*. Such actions may include one or more of the following poll worker actions and voter actions:

- poll opening: poll worker opening the voting terminal
- poll closing: poll worker closing the voting terminal
- screen calibration: poll worker calibrating the display screen
- time reset: poll worker resetting the time on the voting terminal
- report printed: poll working printing a report to either the audit log printer or the report printer
- PEB activation: poll worker activating the voting terminal with a supervisor PEB or voter activating the voting terminal with a voter PEB
- PEB deactivation: deactivation of a voter PEB
- supervisory ballot cast: poll worker inserting a supervisor PEB into the voting terminal and casting a vote for the voter
- supervisory ballot cancelled: poll worker inserting a supervisor PEB into the voting terminal and canceling a vote for the voter
- ballot selection: voter selecting a candidate or referendum position
- ballot de-selection: voter de-selecting a candidate or referendum position
- ballot cast: voter casting a ballot It should be understood that the above poll worker actions and voter actions are merely examples of the types of actions that may be printed on the audit log. Preferably, the audit log is printed in real-time as the actions are taken at the voting terminal.

In the exemplary embodiment, the printable medium comprises a continuous paper roll on which is printed all of the actions taken at the voting terminal between poll opening and poll closing. Preferably, the paper roll is sealed prior to election day so that votes may not be pre-printed on the paper roll. As can be seen in FIG. 3, the paper roll is secured within a locked housing 38 such that the audit log is inaccessible to a voter using voting terminal 28*a*. Of course, the poll workers have access to locked housing 38 in order to load the paper roll, unload the paper roll, clear any paper jams, etc.

Locked housing 38 includes a display window 40 that enables a voter to review a portion of the audit log associated with the voter. As such, the voter may verify the correctness of the descriptions printed on the audit log in real-time as he/she enters his/her selection of votes (although the voter is not required to review the audit log during the voting process). A magnifier may optionally be provided to assist the voter in reviewing the audit log. Of course, it should be understood that the size and configuration of display window 40 may vary between different voting terminals.

Audit log printer 30*a* is also operable to print a plurality of two-dimensional (2D) voter bar codes on the paper roll. Each of the voter bar codes contains information corresponding to a ballot cast by a voter at voting terminal 28*a* (e.g., the final vote selections for that voter). Preferably, each of the voter bar codes is printed on the paper roll proximate the printed voter actions for that voter. In the exemplary embodiment, each of the voter bar codes is of a standard ASCII format that may be scanned by a commercially available 2D bar code reader. Thus, the scanned information from the voter bar codes may be randomly compared against the voter actions printed on the audit log for auditing purposes.

In addition, audit log printer 30*a* is operable to print a vote summary on the paper roll that includes a 2D voting terminal bar code. The voting terminal bar code may contain the serial number of the voting terminal, the total ballots cast on the voting terminal, and the vote totals of each candidate and/or referendum issue on the ballot of the voting terminal. Preferably, the voting terminal bar code is printed at the terminal end of the paper roll so that it may be easily scanned after the election is over. In the exemplary embodiment, the voting terminal bar code is of a standard ASCII format so that it may be scanned by a commercially available bar code reader for verification purposes (as described further below with reference to FIG. 5).

While audit log printer 30*a* is illustrated in FIG. 3 as being directly mounted on voting terminal 28*a,* it should be understood that audit log printer 30*a* could also be located external to voting terminal 28*a*. Of course, one skilled in the art will appreciate that other configurations for audit log printer 30*a* are also within the scope of the present invention.

Figure 4A:
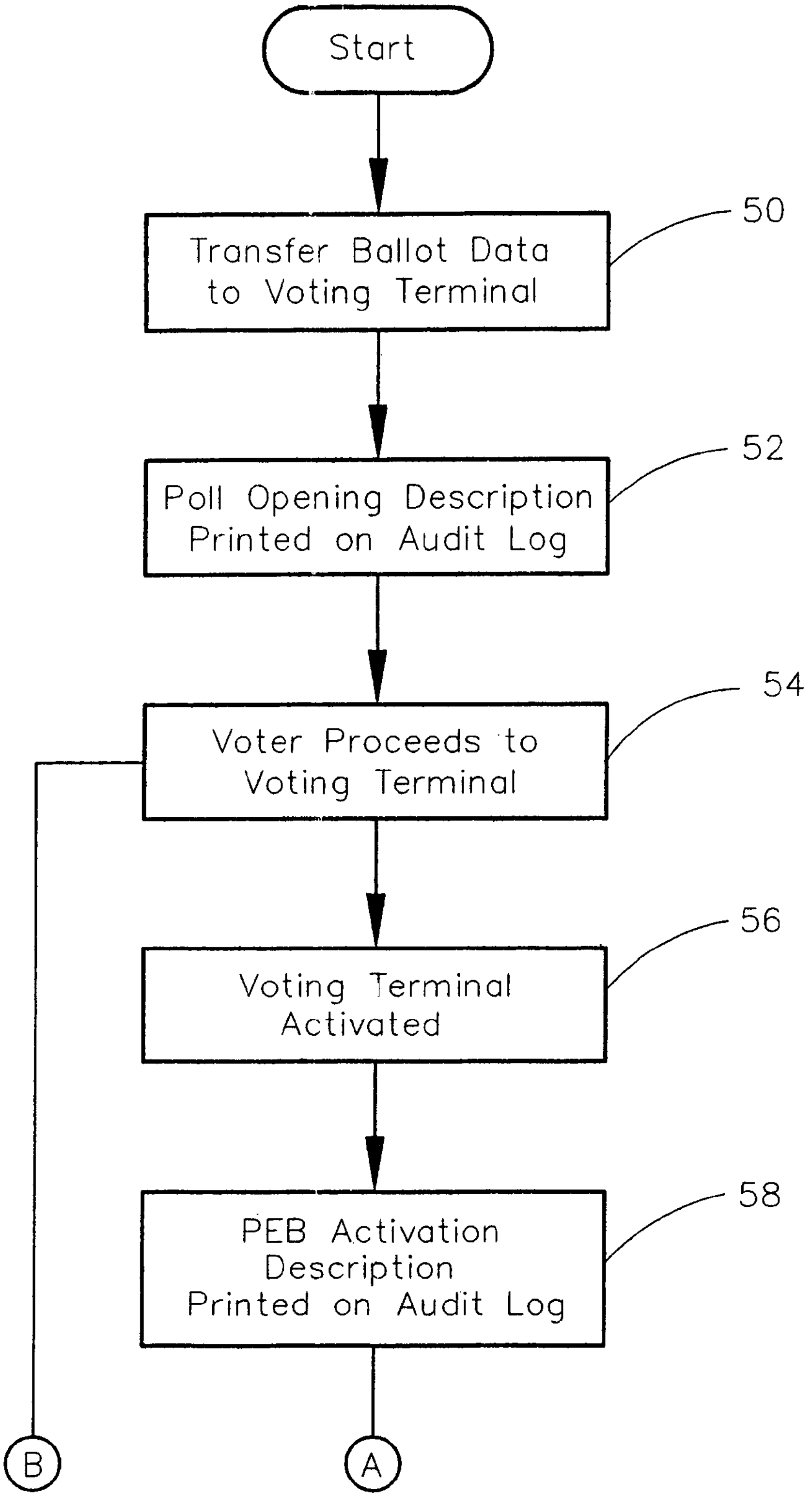
FIGS. 4A-4C are flow charts of an exemplary method for operating the voting terminal and associated audit log printer of FIG. 3.
Figure 4B:
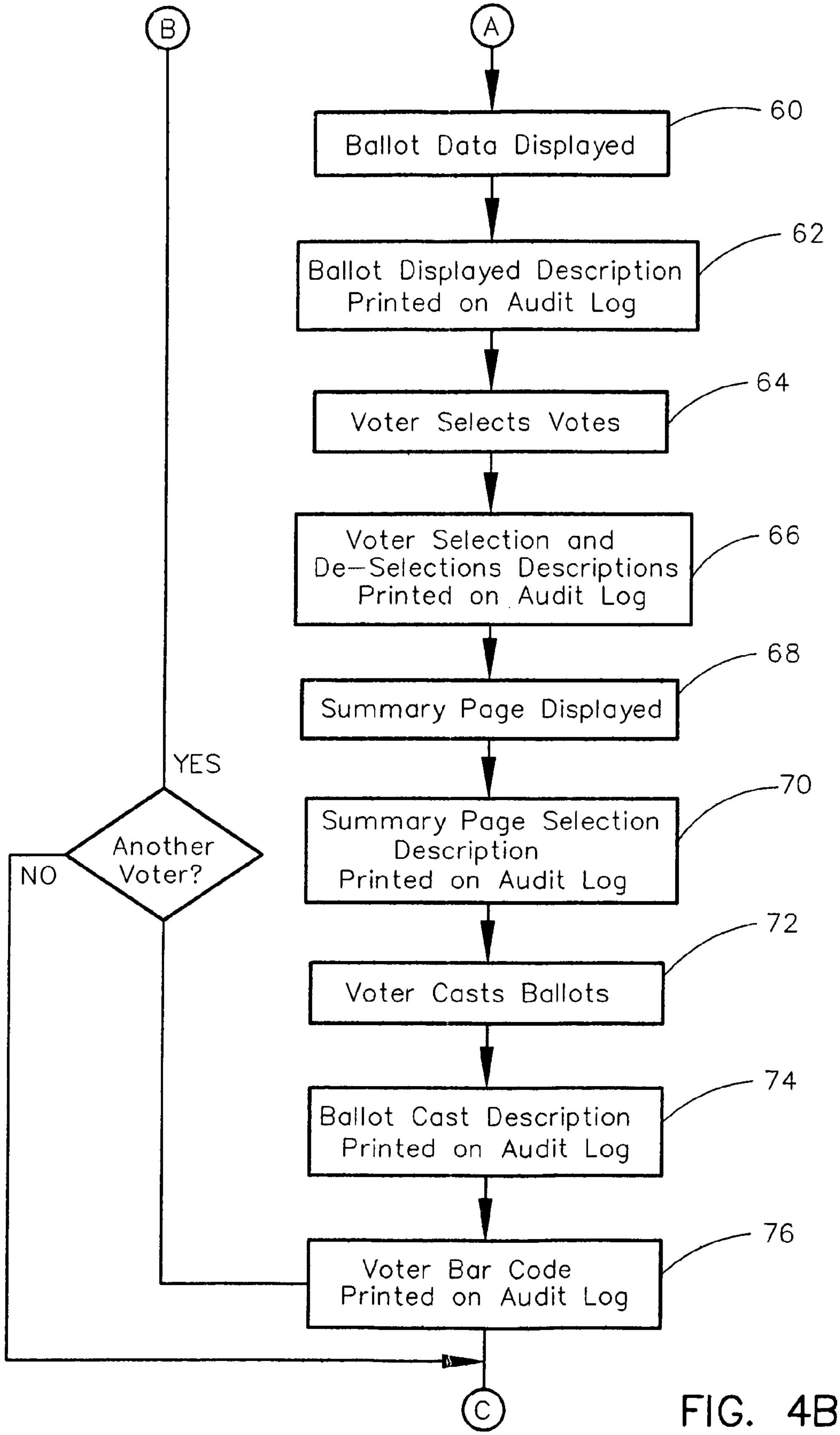
Figure 4C:
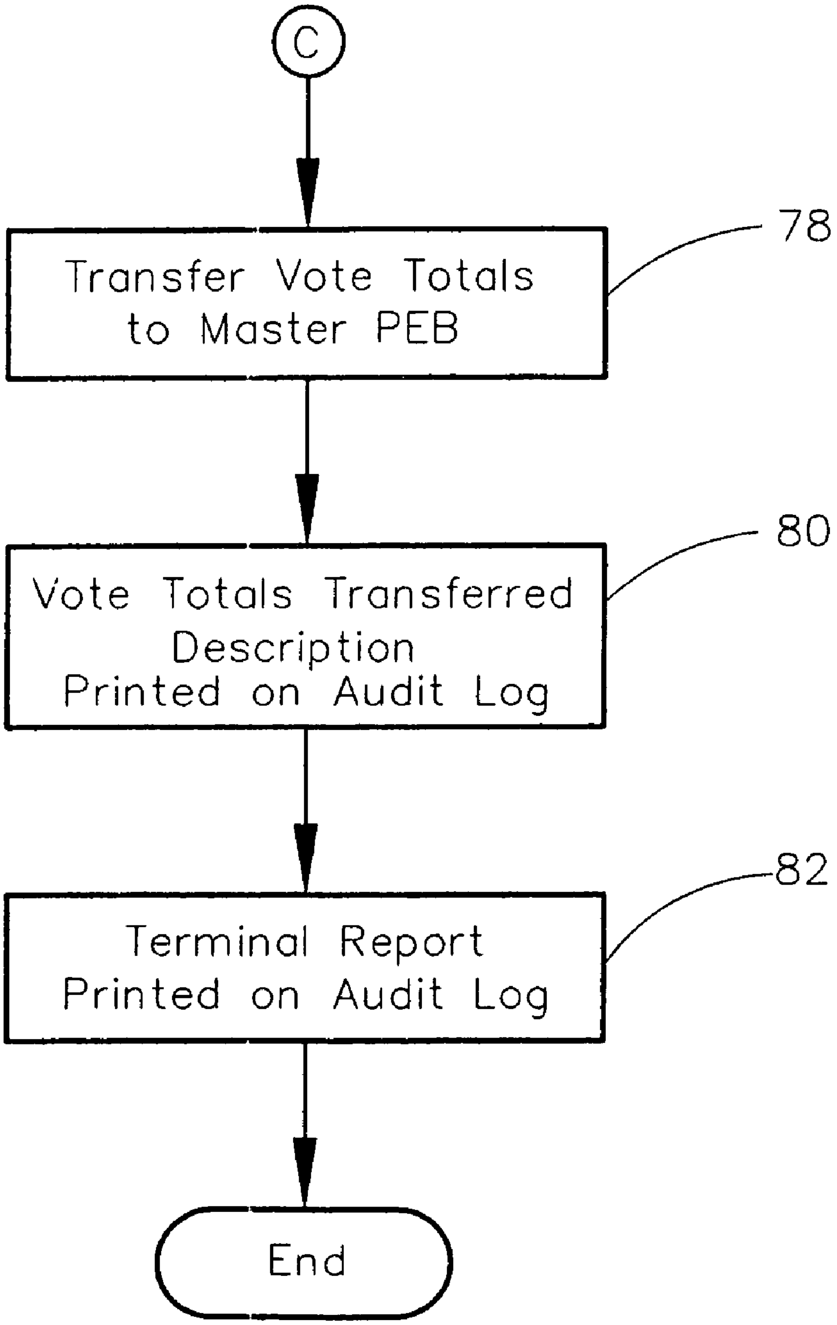

Referring to the flow charts of FIGS. 4A-4C, an exemplary method of the operation of voting terminal 28*a* and audit log printer 30*a* will now be described with reference to steps 50-82. Upon poll opening in step 50, a poll worker inserts a master PEB into PEB reader/writer 32, whereby the ballot data is transferred from the master PEB to voting terminal 28*a*. In response, audit log printer 30*a* prints a description of the action on the audit log in step 52 (e.g., "poll opened and ballot data loaded to voting terminal").

Next, in step 54, a voter is authorized to vote by an appropriate election official, whereby the voter proceeds to voting terminal 28*a*. In step 56, voting terminal 28*a* is activated by inserting either a supervisor PEB or a voter PEB into PEB reader/writer 32 (as described above). In response, audit log printer 30*a* prints a description of the action on the audit log in step 58 (e.g., "PEB activation"). Then, in step 60, the ballot data (i.e., the various candidates and referendum issues to be voted on) are displayed on display 34. In response, audit log printer 30*a* prints a description of the action on the audit log in step 62 (e.g., "ballot displayed").

In step 64, the voter selects his/her votes by touching the appropriate locations on the touch screen of display 34. In response, audit log printer 30*a* prints a description of each action on the audit log in step 66 (e.g., "Governor: select candidate A"; Governor: de-select candidate A", Governor: select candidate B", etc.). In step 68, after all of the votes have been selected, a summary page may be displayed on display 34 for review by the voter. This summary page includes a summary of each of the selected candidates/referendum positions, as well as a summary of the under-voted contests. In response, audit log printer 30*a* prints a description of the action on the audit log in step 70 (e.g., "summary page selected"). Preferably, a summary of the voter's final selection of votes is not printed on the audit log, as the voter has already had an opportunity to review the description of each individual vote selection in real-time as it is printed on the audit log.

In step 72, once the voter verifies that the selected votes are correct, the voter touches a "vote" button and the selected votes are stored in the memory of voting terminal 28*a*. In response, audit log printer 30*a* prints a description of the action on the audit log in step 74 (e.g., "ballot cast"). In addition, audit log printer 30*a* prints a voter bar code on the audit log in step 76. It should be understood that steps 54-76 are repeated for each voter.

Upon poll closing in step 78, the poll worker inserts the master PEB into PEB reader/writer 32, whereby the vote totals for voting terminal 28*a* are transferred from the memory of voting terminal 28 to the master PEB and accumulated with the vote totals for any other voting terminals in voting precinct 20*a* that have already been closed with the master PEB. In response, audit log printer 30*a* prints a description of the action on the audit log in step 80 (e.g., "vote totals transferred to PEB"). Then, audit log printer 30*a* prints the terminal report on the audit log in step 82, which includes the vote summary and voting terminal bar code for voting terminal 28*a*.

It should be understood that the operation of voting terminal 28*a* and audit log printer 30*a* as described in steps 50-82 is merely an exemplary method and that other methods of operation are within the scope of the present invention.

Figure 5:
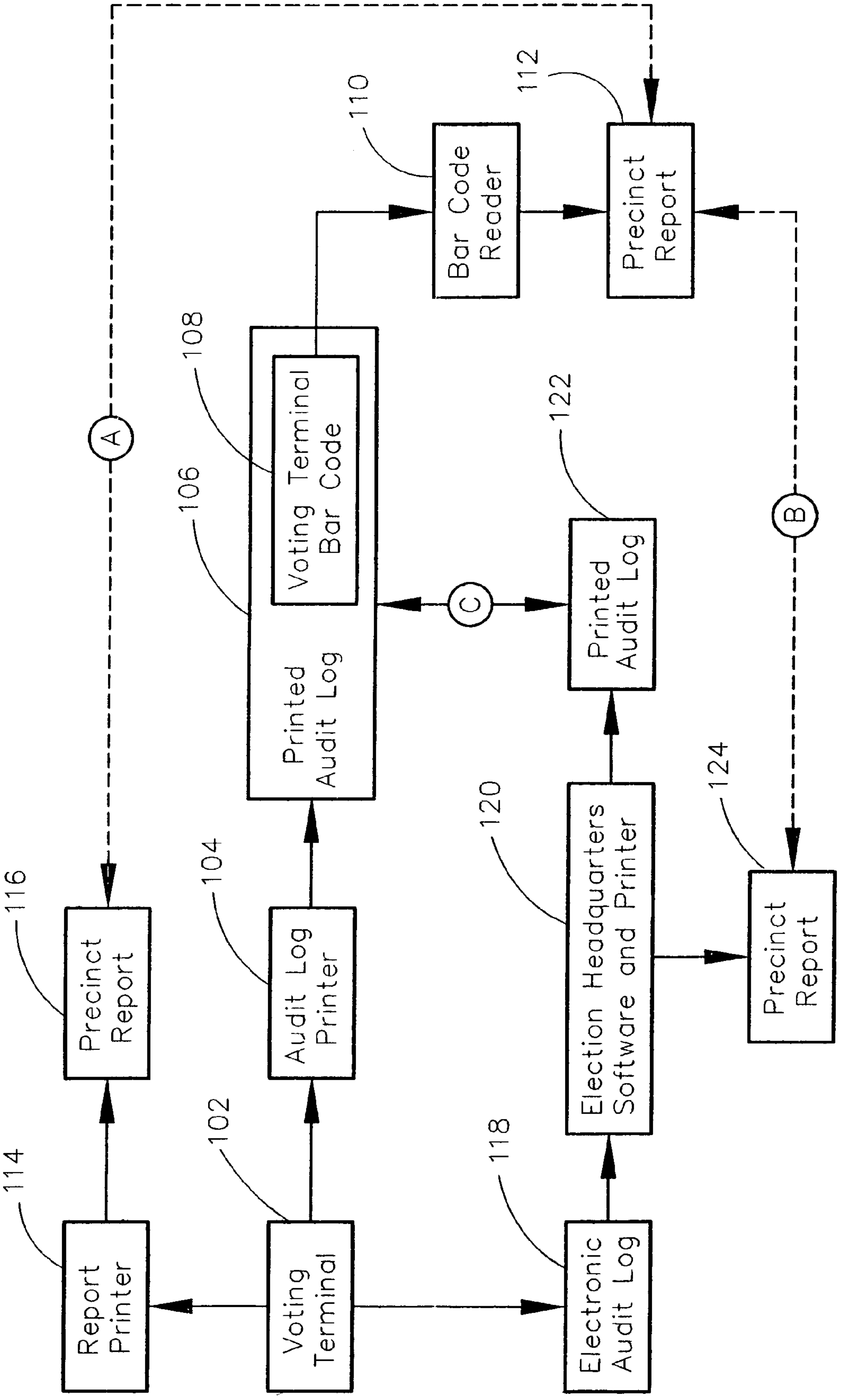
FIG. 5 is a block diagram of the various verification and auditing capabilities of the voting system of FIG. 1.

Referring to FIG. 5, the voting system of the present invention provides various verification and auditing capabilities that may be used to check the integrity of the voting system. As can be seen, a voting terminal 102 is connected to an audit log printer 104 that is operable to print an audit log 106 of all actions taken on voting terminal 102. The printed audit log 106 includes a voting terminal bar code 108 that contains the vote totals of each candidate and/or referendum issue on the ballot of voting terminal 102. A commercially available bar code reader 110 is used to scan voting terminal bar code 108, as well as the voting terminal bar codes of the other voting terminals in the voting precinct. Bar code reader 110 may then be connected to a computer running a commercially available software program (e.g., Excel) that is operable to accumulate the vote totals scanned from each of the voting terminals and print a precinct report 112 accordingly.

If voting terminal 102 is the last voting terminal in the voting precinct to be closed, the poll worker disconnects audit log printer 104 from voting terminal 102 and connects a report printer 114 to voting terminal 102. At this point, the master PEB inserted into the PEB reader/writer of voting terminal 102 contains the accumulated vote totals for all of the voting terminals in the voting precinct. The poll worker is then able to print a precinct report 116 to report printer 114 based on the vote totals contained within the master PEB. The poll worker may then report the "unofficial" election results for the voting precinct to the election headquarters, either by electronically transmitting the information stored on the master PEB to the election headquarters and/or by physically transporting the master PEB to the election headquarters.

Upon poll closing, the poll worker removes the compact flash memory device containing the electronic audit log 118 from voting terminal 102 and physically transports the compact flash memory device (along with the master PEB and precinct report 116) to the election headquarters. The election headquarters utilizes a central software program and printer 120 to download the data from electronic audit log 118 and generate a printed audit log 122. In addition, software program and printer 120 are used to analyze the data downloaded from the electronic audit logs of all of the voting terminals in the voting precinct to thereby generate a precinct report 124.

Importantly, the commercially available bar code reader 110 and computer used to produce precinct report 112 operate independently of voting terminal 102 and report printer 114 used to produce precinct report 116. As such, referring to the comparison circle labeled as "A" in FIG. 5, it can be seen that precinct report 112 may be compared against precinct report 116 in order to verify the accuracy of the vote totals for the voting precinct.

In a similar manner, the commercially available bar code reader 110 and computer used to produce precinct report 112 operate independently of the election headquarter's software program and printer 120 used to produce precinct report 124. As such, referring to the comparison circle labeled as "B" in FIG. 5, it can be seen that precinct report 112 may be compared against precinct report 124 in order to verify the accuracy of the vote totals for the voting precinct.

Furthermore, referring to the comparison circle labeled as "C" in FIG. 5, it can be seen that the individual actions contained within printed audit log 106 (i.e., the actions printed from voting terminal 102 and audit log printer 104) may be compared against the individual actions contained within printed audit log 122 (i.e., the printed version of the electronic audit log exported from voting terminal 102). Thus, the voting election may be audited by comparing certain actions on printed audit log 106 to the same actions on printed audit log 122.

While the present invention has been described and illustrated hereinabove with reference to an exemplary embodiment, it should be understood that various modifications could be made to this embodiment without departing from the scope of the invention. Therefore, the invention is not to be limited to the exemplary embodiment described and illustrated hereinabove, except insofar as such limitations are included in the following claims.

What is claimed and desired to be secured by Letters Patent is as follows:

1. A voting system comprising:

at least one voting terminal operable to record a plurality of actions taken at said voting terminal; and at least one printer connected to said voting terminal and operable to print said actions on a printable medium so as to create a printed audit log in real-time as said actions are taken at said voting terminal, wherein said printer is also operable to print a voting terminal bar code on said printable medium that contains information corresponding to vote totals of all ballots cast by a plurality of voters at said voting terminal.

2. The voting system of claim 1, wherein said actions comprise a plurality of poll worker actions and a plurality of voter actions.

3. The voting system of claim 1, wherein said actions are selected from the following group: poll opening; poll closing; screen calibration; time reset; report printed; PEB activation; PEB deactivation; supervisory ballot cast; supervisory ballot cancelled; ballot selection; ballot de-selection; ballot cast; and combinations thereof.

4. The voting system of claim 1, wherein said printable medium is secured within a locked housing such that said audit log is inaccessible to a voter using said voting terminal.

5. The voting system of claim 4, wherein said locked housing includes a display window that enables said voter to review a portion of said audit log associated with said voter and verify said actions printed on said printable medium.

6. The voting system of claim 1, wherein said printable medium comprises a continuous paper roll on which is printed all of said actions taken at said voting terminal.

7. The voting system of claim 6, wherein said paper roll is uncut so as to remain intact for storage and/or auditing.

8. The voting system of claim 1, wherein said printer is also operable to print a plurality of voter bar codes on said printable medium each of which contains information corresponding to a ballot cast by a voter at said voting terminal.

9. The voting system of claim 8, further comprising a bar code reader operable to scan said voter bar codes printed on said printable medium, wherein said bar code reader operates independently of said voting terminal so as to enable an independent audit comparison of said voter bar codes with said actions printed on said printable medium.

10. The voting system of claim 1, further comprising a bar code reader operable to scan said voting terminal bar code printed on said printable medium, wherein said bar code reader operates independently of said voting terminal so as to provide an independent verification of said vote totals for said voting terminal.

11. The voting system of claim 10, wherein said voting system comprises a plurality of voting terminals located within a voting precinct, and wherein said bar code reader is operable to scan said voting terminal bar code printed on said printable medium of each of said voting terminals so as to obtain said vote totals for all of said voting terminals located within said voting precinct.

12. The voting system of claim 11, further comprising a computer operatively connected to said bar code reader and programmed to accumulate said vote totals for all of said voting terminals located with said voting precinct to thereby generate vote totals for said voting precinct.

13. A method for creating a printed audit log of a voting terminal, said method comprising:

recording a plurality of poll worker actions and a plurality of voter actions taken at said voting terminal;

transferring said poll worker actions and said voter actions from said voting terminal to a printer;

printing said poll worker actions and said voter actions on a printable medium so as to create said printed audit log in real-time as said poli worker actions and said voter actions are taken at said voting terminal; and printing a voting terminal bar code on said printable medium that contains information corresponding to vote totals of all ballots cast by a plurality of voters at said voting terminal.

14. The method of claim 13, wherein said poll worker actions are selected from the following group: poll opening; poll closing; screen calibration; time reset; report printed; PEB activation; PEB deactivation; supervisory ballot cast; supervisory ballot cancelled; and combinations thereof.

15. The method of claim 13, wherein said voter actions are selected from the following group: ballot selection; ballot de-selection; ballot cast; and combinations thereof.

16. The method of claim 13, wherein said audit log comprises all of said poll worker actions and all of said voter actions taken at said voting terminal between poll opening and poil closing.

17. The method of claim 13, further comprising securing said printable medium such that said audit log is inaccessible to a voter using said voting terminal.

18. The method of claim 17, further comprising enabling said voter to review a portion of said audit log associated with said voter so as to verify said voter actions printed on said printable medium.

19. The method of claim 13, further comprising printing a plurality of voter bar codes on said printable medium each of which contains information corresponding to a ballot cast by a voter at said voting terminal.

20. The method of claim 19, further comprising scanning said voter bar codes printed on said printable medium so as to enable an independent audit comparison of said voter bar codes with said voter actions printed on said printable medium.

21. The method of claim 13, further comprising scanning said voting terminal bar code printed on said printable medium so as to provide an independent verification of said vote totals for said voting terminal.

22. A voting system comprising:

at least one voting terminal operable to receive poll worker activity data and voter selection data; and at least one printer connected to said voting terminal and operable to print said poll worker activity data and said voter selection data on a printable medium so as to create a printed audit log for said voting terminal, and wherein said printer is also operable to print a voting terminal bar code on said printable medium that contains information corresponding to vote totals of all ballots cast by a plurality of voters at said voting terminal.

23. The voting system of claim 22, wherein said poll worker activity data and said voter selection data are printed on said printable medium in real-time as said poll worker activity data and said voter selection data are received at said voting terminal.

24. The voting system of claim 22, wherein said poll worker activity data comprises a plurality of poll worker actions selected from the following group: poll opening; poll closing; screen calibration; time reset; report printed; PEB activation; PEB deactivation; supervisory ballot cast; supervisory ballot cancelled; and combinations thereof.

25. The voting system of claim 22, wherein said voter selection data comprises a plurality of voter actions selected from the following group: ballot selection; ballot de-selection; ballot cast; and combinations thereof.

26. The voting system of claim 22, wherein said printable medium comprises a continuous paper roll on which is printed all of said poll worker activity data and all of said voter selection data received at said voting terminal between poll opening and poll closing.

27. A method for creating a printed audit log of a voting terminal, said method comprising:

receiving poll worker activity data and voter selection data at said voting terminal;

transferring said poll worker activity data and said voter selection data from said voting terminal to a printer;

printing said poll worker activity data and said voter selection data on a printable medium so as to create said printed audit log in real-time as said poii worker activity data and said voter selection data are received at said voting terminal;

securing said printable medium such that said audit log is inaccessible to a voter using said voting terminal;

enabling said voter to review a portion of said audit log associated with said voter so as to verify said voter selection data printed on said printable medium; and printing a voting terminal bar code on said printable medium that contains information corresponding to vote totals of all ballots cast by a plurality of voters at said voting terminal.

28. The method of claim 27, wherein said poll worker activity data comprises a plurality of poll worker actions selected from the following group: poll opening; poll closing; screen calibration; time reset; report printed; PEB activation; PEB deactivation; supervisory ballot cast; supervisory ballot cancelled; and combinations thereof.

29. The method of claim 27, wherein said voter selection data comprises a plurality of voter actions selected from the following group: ballot selection; ballot de-selection; ballot cast; and combinations thereof.

30. The method of claim 27, further comprising printing a plurality of voter bar codes on said printable medium each of which contains information corresponding to a ballot cast by a voter at said voting terminal.

31. The method of claim 30, further comprising scanning said voter bar codes printed on said printable medium so as to enable an independent audit comparison of said voter bar codes with said voter selection data printed on said printable medium.

32. The method of claim 27, further comprising scanning said voting terminal bar code printed on said printable medium so as to provide an independent verification of said vote totals for said voting terminal.

33. A voting system comprising:

means for receiving poll worker activity data and voter selection data; and means for printing said poii worker activity data and said voter selection data on a printable medium so as to create a printed audit log in real-time as said poll worker activity data and said voter selection data are received at said receiving means, wherein said printing means also prints a voting terminal bar code on said printable medium that contains information corresponding to vote totals of all ballots cast by a plurality of voters; and means for securing said printable medium such that said audit log is inaccessible to a voter, wherein said securing means enables said voter to review a portion of said audit log associated with said voter and verify said voter selection data printed on said printable medium.

34. The voting system of claim 33, wherein said poll worker activity data comprises a plurality of poll worker actions selected from the following group: poll opening; poll closing; screen calibration; time reset; report printed; PEB activation; PEB deactivation; supervisory ballot cast; supervisory ballot cancelled; and combinations thereof.

35. The voting system of claim 33, wherein said voter selection data comprises a plurality of voter actions selected from the following group: ballot selection; ballot de-selection; ballot cast; and combinations thereof.

36. The voting system of claim 33, wherein said printing means also prints a plurality of voter bar codes on said printable medium each of which contains information corresponding to a ballot cast by a voter.

37. The voting system of claim 36, further comprising means for scanning said voter bar codes printed on said printable medium so as to enable an independent audit comparison of said voter bar codes with said voter selection data printed on said printable medium.

38. The voting system of claim 33, further comprising means for scanning said voting terminal bar code printed on said printable medium so as to provide an independent verification of said vote totals.

39. A voting system comprising:

at least one voting terminal operable to record a plurality of poll worker actions and a plurality of voter actions taken at said voting terminal;

at least one printer connected to said voting terminal and operable to print said poll worker actions and said voter actions on a continuous paper roll so as to create a printed audit log in real-time as said poll worker actions and said voter actions are taken at said voting terminal;

wherein said paper roll is secured within a locked housing such that said audit log is inaccessible to a voter using said voting terminal, and wherein said locked housing includes a display window that enables said voter to review a portion of said audit log associated with said voter and verify said voter actions printed on said paper roll;

wherein said printer is also operable to print a plurality of voter bar codes on said paper roll each of which contains information corresponding to a ballot cast by a voter at said voting terminal; and wherein said printer is further operable to print a voting terminal bar code on said paper roll that contains information corresponding to vote totals of all ballots cast by a plurality of voters at said voting terminal.

40. The voting system of claim 39, wherein said poll worker actions are selected from the following group: poll opening; poll closing; screen calibration; time reset; report printed; PEB activation; PEB deactivation; supervisory ballot cast; supervisory ballot cancelled; and combinations thereof.

41. The voting system of claim 39, wherein said voter actions are selected from the following group: ballot selection; ballot de-selection; ballot cast; and combinations thereof.

42. The voting system of claim 39, further comprising a bar code reader that operates independently of said voting terminal, wherein said bar code reader is operable to:

scan said voter bar codes printed on said paper roll so as to enable an independent audit comparison of said voter bar codes with said voter actions printed on said paper roll; and scan said voting terminal bar code printed on said paper roll so as to provide an independent verification of said vote totals for said voting terminal.

* * * * *

UNITED STATES PATENT AND TRADEMARK OFFICE

CERTIFICATE OF CORRECTION

PATENT NO. : 7,387,244 B2 
APPLICATION NO. : 11/139189
DATED : June 17, 2008
INVENTOR(S) : Steve Bolton et al.

It is certified that error appears in the above-identified patent and that said Letters Patent is hereby corrected as shown below:

Column 11,
Line 60, delete "poii" and insert -- poll -- therefor.

Column 12,
Line 31, delete "poii" and insert -- poll -- therefor.

Signed and Sealed this

Sixth Day of January, 2009

JON W. DUDAS
*Director of the United States Patent and Trademark Office*